United States Patent
Watanabe et al.

(10) Patent No.: US 11,234,115 B2
(45) Date of Patent: Jan. 25, 2022

(54) TECHNIQUES TO FACILITATE MOBILITY MANAGEMENT ENTITY (MME) IDENTIFICATION FOR USER EQUIPMENT CONTEXT TRANSFER

(71) Applicant: Cisco Technology, Inc., San Jose, CA (US)

(72) Inventors: Ryo Watanabe, Tokyo (JP); Aeneas Sean Dodd-Noble, Andover, MA (US); Santhosh Shenoy Panambur, Karnataka (IN); Om Prakash Suthar, Bolingbrook, IL (US); Raghavendra Vidyashankar Suryanarayanarao, Bangalore South (IN); Vivek Agarwal, Chelmsford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/791,500

(22) Filed: Feb. 14, 2020

(65) Prior Publication Data
US 2021/0258766 A1 Aug. 19, 2021

(51) Int. Cl.
*H04W 4/00* (2018.01)
*H04W 8/08* (2009.01)
(Continued)

(52) U.S. Cl.
CPC ........... *H04W 8/08* (2013.01); *H04L 61/1511* (2013.01); *H04W 36/0022* (2013.01);
(Continued)

(58) Field of Classification Search
CPC ..... H04W 8/08; H04W 8/18; H04W 36/0022; H04W 36/0033; H04W 36/32;
(Continued)

(56) References Cited

U.S. PATENT DOCUMENTS

2019/0014504 A1\* 1/2019 Shimojou ............. H04W 28/24
2019/0159157 A1\* 5/2019 Gupta ................. H04W 60/005
(Continued)

FOREIGN PATENT DOCUMENTS

WO  2019075623 A1  4/2019
WO  2019077801 A1  4/2019

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, 417 pages.
(Continued)

*Primary Examiner* — Matthew W Genack
(74) *Attorney, Agent, or Firm* — Edell, Shapiro & Finnan, LLC (57) ABSTRACT

Presented herein are efficient techniques through which a Third Generation Partnership Project (3GPP) Access and Mobility Management Function (AMF) may retrieve information for a Mobility Management Entity (MME) to support graceful mobility for various inter-Radio Access Technology (inter-RAT) mobility scenarios. In one example, a method includes determining, by an AMF, an inter-RAT mobility event for a user equipment; identifying, by the AMF, an MME associated with the inter-RAT mobility event based, at least in part, on MME information contained in a network database; and transferring context information for the user equipment between the AMF and the MME. In one instance, the network database may be a Network Repository Function (NRF) for a 3GPP Fifth Generation mobile network and the MME information may be associated with an MME network function type stored in the NRF.

20 Claims, 6 Drawing Sheets (51) Int. Cl.
*H04L 29/12* (2006.01)
*H04W 36/00* (2009.01)
*H04W 36/32* (2009.01)
*H04W 48/16* (2009.01)
*H04W 60/00* (2009.01)

(52) U.S. Cl.
CPC .......... *H04W 36/32* (2013.01); *H04W 48/16* (2013.01); *H04W 60/00* (2013.01)

(58) Field of Classification Search
CPC ...... H04W 48/16; H04W 60/00; H04L 61/15; H04L 61/1511
See application file for complete search history.

(56) References Cited

U.S. PATENT DOCUMENTS

| 2020/0007628 | A1* | 1/2020 | Arunachalam | ....... H04L 67/141 |
| 2020/0245218 | A1* | 7/2020 | Wang | .................... H04W 36/18 |
| 2021/0068005 | A1* | 3/2021 | Huang | ................... H04W 8/08 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.5.0, Dec. 2019, 436 pages.

ScienceDirect, "Subscriber Identity", https://www.sciencedirect.com/topics/computer-science/subscriber-identity, downloaded Feb. 13, 2020, 19 pages.

M. Mealling, "Dynamic Delegation Discovery System (DDDS) Part Three: The Domain Name System (DNS) Database", Network Working Group, Request for Comments: 3403, Obsoletes: 2915, 2168, Category: Standards Track, Oct. 2002, 14 pages.

3GPP, "3rd Generation Partnership Project; Technical Specification Group Core Network and Terminals; 5G System; Common Data Types for Service Based Interfaces; Stage 3 (Release 16)", 3GPP TS 29.571 V16.2.0, Dec. 2019, 96 pages.

3GPP, "3rd Generation Partnership Project; Technical Specification Group Core Network and Terminals; 5G System; Network Function Repository Services; Stage 3 (Release 16)", 3GPP TS 29.510 V16.2.0, Dec. 2019, 167 pages.

3GPP, "3rd Generation Partnership Project; Technical Specification Group Core Network and Terminals; Domain Name System Procedures; Stage 3 (Release 16)", 3GPP TS 29.303 V16.1.0, Dec. 2019, 79 pages.

3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, 558 pages.

Nokia et al., "TS 23.501 OI:11 Interworking and Network slicing", 3GPP TSG SA WG2 Meeting #124, S2-178530, Nov. 27-Dec. 1, 2017, 3 pages.

Partial International Search Report and Written Opinion in counterpart International Application No. PCT/US2021/017020, dated May 11, 2021, 13 pages.

International Search Report and Written Opinion in counterpart International Application No. PCT/US2021/017020, dated Jul. 2, 2021, 19 pages.

* cited by examiner

TECHNIQUES TO FACILITATE MOBILITY MANAGEMENT ENTITY (MME) IDENTIFICATION FOR USER EQUIPMENT CONTEXT TRANSFER

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in obtaining user equipment context for scenarios involving inter-access technology transitions for user equipment within mobile networking environments.

DESCRIPTION OF EXAMPLE EMBODIMENTS

Overview

Presented herein are efficient techniques through which a Third (3rd) Generation Partnership Project (3GPP) Access and Mobility Management Function (AMF) of a Fifth (5th) Generation (5G) mobile network can retrieve information for a Mobility Management Entity (MME) of a 3GPP Fourth (4th) Generation (4G) mobile network to support graceful mobility for various inter-Radio Access Technology (inter-RAT) mobility scenarios. Such inter-RAT mobility scenarios may include inter-RAT mobility single-mode registration involved in 4G Evolved Packet System (EPS) to 5G system (5GS) idle mode user equipment transitions and 5GS to 4G EPS user equipment connected mode handover scenarios.

The techniques presented herein bridge a gap that is observed in current 3GPP standards for these mobility-interworking scenarios. Without the techniques presented herein, an AMF may not successfully derive peer-MME node information, which can lead to failures for inter-RAT mobility for the EPS to 5GS single-registration idle mode scenario and also for the 5GS to EPS handover scenario, each of which can negatively affect subscriber mobility experience.

In an example embodiment, a method is provided that may include determining, by an AMF, an inter-RAT mobility event for a user equipment; identifying, by the AMF, an MME associated with the inter-RAT mobility event based, at least in part, on MME information contained in a network database; and transferring context information for the user equipment between the AMF and the MME. The network database may be a Network Repository Function (NRF) for a Third Generation Partnership Project (3GPP) Fifth Generation (5G) mobile network and the MME information may be stored in the NRF for a custom MME network function (NF) type in accordance with techniques discussed herein.

In some implementations, the MME information can be stored in the NRF by the MME in which the MME is configured to interface directly with the NRF. In still some implementations, a proxy or interworking function, such as an NRF proxy, may be communicatively coupled to the MME and the NRF and may facilitate storing the MME information in the NRF. In still some implementations, a proxy or interworking function (e.g., an NRF proxy) may be communicatively coupled to a Domain Name System (DNS) server that interfaces with the MME and may be communicatively coupled to the NRF to facilitate storing the MME information in the NRF. In still some implementations, a DNS client may be configured for the NRF in which the DNS client is communicatively coupled to a DNS server that interfaces the MME to facilitate storing the MME information in the NRF.

Example Embodiments

3GPP specifications define operations for handling inter-RAT mobility of single-registration mode subscribers through Tracking Area Update (TAU) procedures within the context of 5GS to EPS user equipment (UE) transitions in which a (new) MME of EPS can select the (old) AMF of 5GS in order to transfer the context from 5GS to EPS over the N26 interface that facilitates MME/AMF communications. In this scenario, the MME triggers a DNS query for (old) AMF address resolution with various options as discussed below (as per 3GPP Technical Specification (TS) for DNS, 3GPP TS 29.303 (Release 16), Section 4.3.3.4 and 4.3.3.8):

1. MME node Fully Qualified Domain Name (FQDN) (with code space co-ordination between AMF Region ID and MME Group ID (MMEGI)), which can be used by MMEs not upgraded to support the procedure specified in clause 4.3.3.8. In this case, AMFs can be provisioned in the DNS as MMEs.
2. AMF node FQDN, which may not involve code space co-ordination between AMF Region ID and MMEGI. However, in this case, an MME is be upgraded to support this AMF node FQDN based DNS query for AMF (old) address resolution.

In the vice-versa inter-RAT mobility scenario, when a single-registration mode subscriber (e.g., an idle mode user equipment) moves from EPS to 5GS using the 5G Registration procedure that involves context transfer from an MME (old) to an AMF (new). For the 5G Registration procedure, 3GPP TS 23.501 (Release 16) and TS 23.502

(Release 16) Specifications describe a call-flow that assumes that an old MME can be selected by a new AMF in order to perform a context transfer over the N26 interface; however, current 3GPP Specifications do not describe an efficient method of selecting or resolving (generally referred to herein as 'identifying') the old MME by the new AMF. Thus, the lack of an efficient mechanism that can be utilized by the AMF to identify the old MME for the EPS to 5GS idle mode mobility interworking scenario is a large gap that is not addressed by current 3GPP standards.

A similar problem can occur in the case of inter-RAT subscriber mobility from 5GS to EPS involving a connected mode handover scenario in which a 5G AMF is to resolve the new 4G MME Internet Protocol (IP) address in order to transfer user equipment context information over the N26 interface as part of the connected mode handover procedure. For this scenario, an efficient mechanism is not provided by current 3GPP Specifications that describes how an AMF is to resolve the IP address of a 4G MME using a target evolved NodeB (eNodeB or eNB) eNodeB identity/identifier (ID) or any other identity.

3GPP Specifications define that a Network Repository Function (NRF) for a 5G core is to be the network function (NF)/entity that may facilitate equivalent processes as a DNS server performs for legacy 3rd Generation (3G) Universal Mobile Telecommunication System (UMTS) cores and 4G Long Term Evolution (LTE)/EPS cores.

For EPS to 5GS mobility (of connected or idle subscribers) via the registration procedure scenario, it would be advantageous for an AMF of a 5G core to be capable of discovering an (old) 4G MME NF instance via the NRF; however, current 3GPP Specifications do not provide a mechanism for populating the NRF with MME information. Current 3GPP Specifications define a Nnrf interface that an AMF can utilize to interface with the NRF; however, Nnrf interface support from the MME is not currently available within 3GPP Specifications. Further, the MME node is not identified in the network function (NF) list of network function types (NFtype or NF type) supported for the NRF per 3GPP TS 29.510 (Release 16).

As there is currently no efficient mechanism/method prescribed by 3GPP Specifications to resolve an MME (old) IP address by an AMF, EPS to 5GS inter-RAT mobility via the Registration procedure on the 5G core using the N26 interface can fail, which can force single-registration mode based subscribers to re-attach to the 5G core. Re-attachment can lead to additional signaling as part of a new registration and/or Protocol Data Unit (PDU) session establishment, which may cause a UE/application to experience IP session discontinuity. Similar issues may arise for 5GS to EPS inter-RAT connected mode mobility scenarios, as discussed herein. Accordingly, it may be advantageous to provide graceful techniques for handling these inter-RAT mobility scenarios in order to improve or enhance subscriber experience.

Presented herein are various techniques that may facilitate identifying/retrieving, by an AMF of a 5G mobile network, MME information from a network database, such as an 5G NRF, to support graceful mobility for UE context transfers for various inter-RAT mobility scenarios including, but not limited to, EPS to 5GS single-registration (idle) mode UE transitions and 5GS to EPS connected mode UE handovers.

Figure 1:
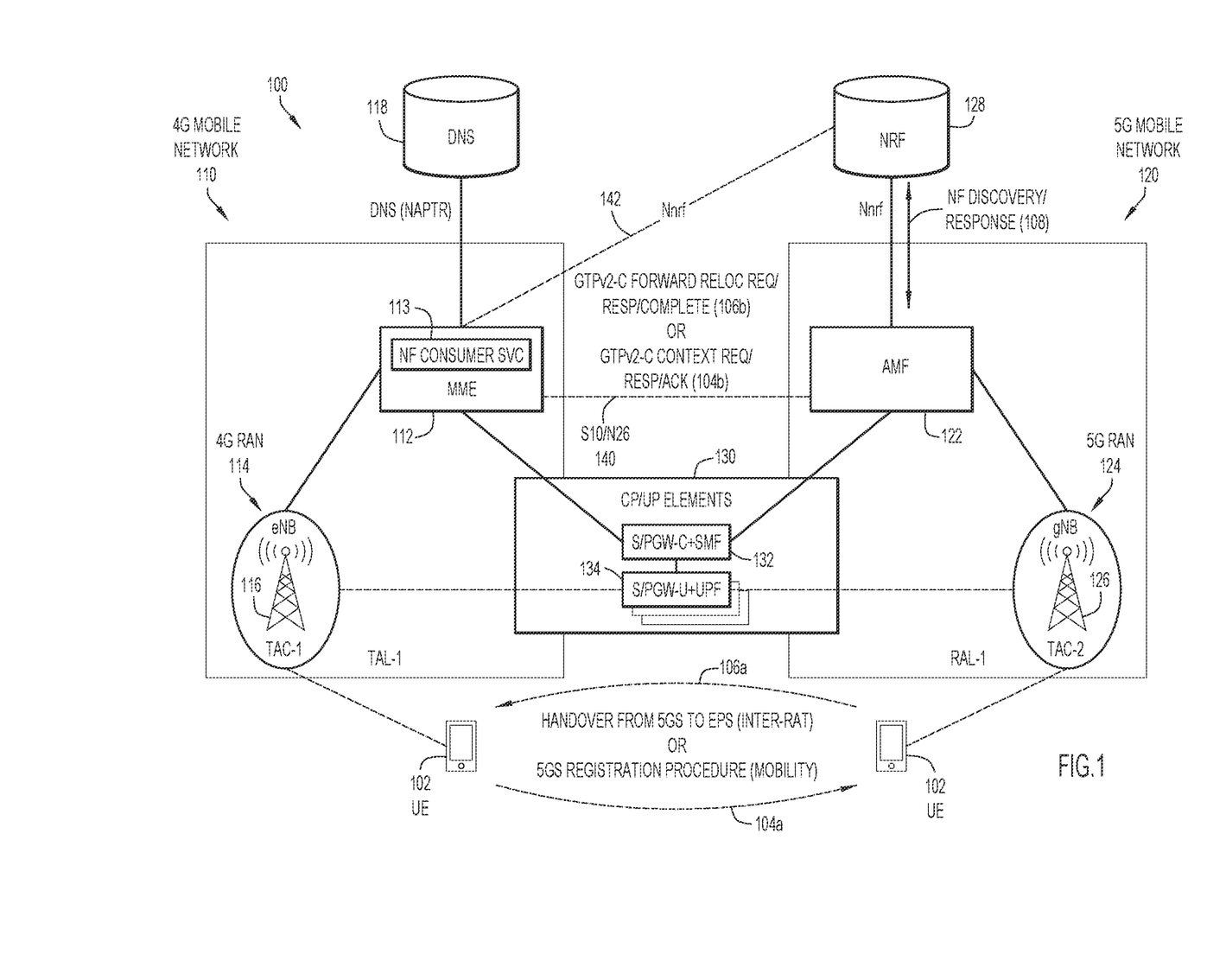
FIG. 1 is a diagram of a system in which techniques that facilitate mobility management entity (MME) identification for a user equipment context transfer may be implemented, according to an example embodiment.

Referring to FIG. 1, FIG. 1 is a block diagram of a system 100 in which techniques that facilitate MME identification for a user equipment (UE) context transfer may be implemented, according to an example embodiment. System 100 may include a 4G mobile network 110 and a 5G mobile network 120. Also shown in FIG. 1 is a UE 102.

A 4G mobile network, such as 4G mobile network 110, may be referred to herein interchangeably using the terms '4G EPS', 'EPS', 'LTE', and variations thereof. A 5G mobile network, such as 5G mobile network 120 may be referred to herein interchangeably using the terms '5GS', '5GC', and variations thereof.

4G mobile network 110 (EPS) may include an MME 112, a 4G Radio Access Network (RAN) 114 (also referred to as an Evolved Universal Mobile Telecommunication System (UMTS) Terrestrial Radio Access Network (E-UTRAN)), and a DNS server 118. 4G RAN 114 may include an eNB 116, which may be configured for a first tracking area list (TAL-1), which may include, at least in part, a first tracking area code (TAC-1). It is to be understood that other TACs may or may not be identified within TAL-1. 4G mobile network 110 may also include various control plane (CP) and user plane (UP) elements 130 associated therewith for a Control and User Plane Separation (CUPS) implementation (e.g., a virtualized network infrastructure) including control plane Serving Gateways and Packet Data Network (PDN) Gateways (S/PGW-C) and user plane Serving Gateways and PDN Gateways (S/PGW-U).

For 4G mobile network 110, MME 112 may interface with eNB 116, the control plane gateways S/PGW-C, and DNS server 118. The Control plane gateways S/PGW-C may further interface with the user plane gateways S/PGW-U, which may further interface with eNB 116.

Among other operations as discussed for various embodiments described herein, an MME, such as MME 112, generally performs operations for a 4G mobile network such as tracking area list management, idle mode UE tracking, bearer activation and deactivation, authentication services, etc. For a 3GPP 4G CUPS architecture, the control plane element(s) can include any number of MMEs as well as SGW-Cs, and PGW-Cs (e.g., S/PGW-C) that can manipulate the user plane network infrastructure to facilitate end-to-end mobile network connectivity. User plane forwarding elements (e.g., S/PGW-U) can process and perform operations on subscriber (e.g., UE) traffic as the traffic passes through the mobile network.

A DNS server, such a DNS server 118, may provide lookup services for a 4G mobile network for system resources (e.g., hosts, services, functions, etc.) to provide resource records for various DNS queries as prescribed at least by 3GPP TS 29.303. Resource records may include A and AAAA resource records in an which A record may define an IP version 4 (IPv4) host address and an AAAA resource record may define an IP version 6 (IPv6) host address. Resource records may also include Naming Authority Pointer (NAPTR) resource records, as defined according to Internet Engineering Task Force (IETF) Request For Comments (RFC) 3403. Although only one MME is illustrated for systems discussed herein, it is to be understood that systems may include multiple MMEs for various deployments. A DNS server, such as DNS server 118, may include resource records for any number of system resources (e.g., any number of MMEs) that may be implemented for a system.

5G Mobile network 120 (5GS) may include an AMF 122, a 5G RAN 124, and an NRF 128. 5G RAN 124 (also referred to as 5G New Radio (NR) access) may include a next generation NodeB (gNodeB or gNB) 126 which may be configured for a first registration area list (RAL-1), which may include, at least in part, a second tracking area code (TAC-2). It is to be understood that other TACs may or may not be identified within RAL-1. 5G mobile network 120 may also include various CP elements such as a Session Management Function (SMF) and UP elements such as a User Plane Function (UPF). Although a 5G RAN, such as 5G RAN 124, is illustrated for systems described herein, it is to be understood that any next Generation (nG) RAN may be utilized in accordance with techniques discussed for various embodiments described herein. For example, in some embodiments, the AMF 122, NRF 128, SMF, and an nG RAN (5G RAN 124)/gNB 126 may be implemented for any nG mobile network deployment.

Typically, an AMF, such as AMF 122, provides access authentication services, authorization services, and mobility management control. Typically, an SMF is responsible for session management with individual functions being supported on a per session basis and also for selection and control of a UPF for data transfers. For 5G mobile network 120, AMF 122 may interface with gNB 126, the SMF, and NRF 128 (via an Nnrf 128). The SMF may further interface with the UPF, which may further interface with eNB 116.

As illustrated in FIG. 1, MME 112 and AMF 122 may interface via any combination of a 3GPP S10 and/or a 3GPP N26 (S10/N26) interface 140. In some implementations, an MME may not support the 3GPP N26 interface, as prescribed by 3GPP 5G standards. For example, there could be situations in which an MME (e.g., as part of a Home Public Land Mobile Network (HPLMN) or a Visited PLMN (VLMN) may support only the S10 interface for inter-RAT mobility (interworking) scenarios. Although only one AMF is illustrated for systems discussed herein, it is to be understood that systems may include multiple AMFs for various deployments.

As an SMF for a 5G mobile network may perform operations analogous to those of an S/PGW-C of a 4G mobile network, the S/PGW-C and SMF for the 4G and 5G mobile networks discussed herein may be referred to collectively as 'S/PGW-C+SMF' 132. As a UPF for a 5G mobile network may perform operations analogous to those of an S/PGW-U of a 4GG mobile network, the S/PGW-U and UPF for the 4G and 5G mobile networks discussed herein may be referred to collectively as 'S/PGW-U+UPF' 134.

Generally, an NRF, such as NRF 128, can support functionality for a 5G mobile network as may be prescribed by 3GPP TS 29.510 such as maintaining/managing NF profiles of available NF instances (e.g., for maintaining service information for services supported by NFs, notifying NF instances about registration in the NRF of new NF instances (if subscribed to receive such notifications), and/or supporting service discovery functions). In one example, service discovery may be facilitated by the NRF 128 receiving a NF Discovery Request, which can be initiated by the AMF 122 via use of an NF Discover primitive (i.e., the Nnrf_NFDiscovery, as defined by 3GPP TS 29.510). In response to such an NF Discovery Request, the NRF 128 may provide information of the available NF instances stored in the NRF that may fulfill certain criteria (e.g., criteria included in the request).

For the 4G RAN 114, eNB 116 may include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air Radio Frequency (RF) communications with UE 102. For 5G RAN 124, gNB 126 may also include any combination of hardware (e.g., communications units, receiver(s), transmitter(s), antenna(s) and/or antenna array(s), processor(s), memory element(s), baseband processor(s) (modems), etc.)], software, logic, and/or the like that may facilitate access network connections for one or more elements of systems discussed herein, including, but not limited to, over-the-air RF communications with UE 102.

In various embodiments, UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a 4G cellular communications unit, a 5G cellular communications unit, a Wi-Fi® communications unit, etc.) to facilitate over-the-air interfaces with any combination of RANs (e.g., 4G RAN 114 and 5G RAN 124).

Various inter-RAT mobility scenarios are generally illustrated in FIG. 1, including a 5GS registration procedure mobility scenario 104a involving the UE 102 transitioning from the 4G mobile network (EPS) 110 to the 5G mobile network (5GS) 120 while in an idle mode. Further, 5G mobile network (5GS) 120 to 4G mobile network (EPS) handover scenario 106a is also illustrated in FIG. 1 involving a connected mode handover for UE 102 from the 5G mobile network 120 to the 4G mobile network.

To facilitate graceful handling of various inter-RAT scenarios (e.g., scenarios 104a and 106a, as illustrated in FIG. 1) techniques herein provide for configuring the MME 112 as a new/custom NF type, which may be named 'CUSTOM_MME' in one example, to enable the MME 112 to perform the NF management services as defined in the 3GPP NRF Specification (3GPP TS 29.510). In various embodiments, such NF management services may include, but not be limited to, registering to the NRF 128, de-registering from the NRF 128, performing NF updates to the NRF 128 with appropriate profile and/or service information, performing Status subscribe and Notify functions, etc. as may be prescribed by the 3GPP NRF Specification.

Various system implementations may be utilized in order to facilitate configuring an MME as a new NF type within an NRF. As shown for the embodiment of FIG. 1, MME 112 may be configured with logic (e.g., a NF consumer service (svc) module/logic 113 or the like may be embedded within the MME 112) to enable the MME 112 to interface directly with NRF 128 via a 3GPP-defined Nnrf interface 142.

In some embodiments, as discussed in further detail below with reference to FIG. 2, a proxy or interworking function, such as an NRF proxy, may be communicatively coupled to the MME and the NRF for a system may facilitate storing the MME information in the NRF. In still some embodiments, as discussed in further detail below with reference to FIG. 3, a proxy or interworking function (IWF) (e.g., an NRF proxy) may be communicatively coupled to DNS that interfaces with an MME and may be communicatively coupled to an NRF for a system to facilitate storing the MME information in the NRF. In still some embodiments, as discussed below with reference to FIG. 4, a DNS client may be configured for an NRF in which the DNS client is communicatively coupled to a DNS server that interfaces with an MME for a system to facilitate storing the MME information in the NRF.

Thus, various techniques are provided herein in order to enable configuring an MME as a new NF type within an NRF such that the MME can be registered (e.g., stored) in the NRF in which NF services and NF profiles can also be defined for the MME in the NRF. Registering/storing each MME for a system (as there may be multiple MMEs for a deployment) as a new NF type within the NRF (with appropriately defined NF services and NF profiles) may enable the AMF to identify a corresponding MME for UE context transfers for various inter-RAT mobility scenarios (e.g., scenarios 104a and 106a). Further, once an MME is registered to the NRF, the MME may be able to perform the NF management services (e.g., de-register, update, subscribe, etc.), which can assist the AMF to identify a corresponding MME (e.g., using the NF Discover service primitive) to determine information of the MME during such inter-RAT mobility scenarios.

As noted, registering an MME with an NRF, such as registering MME 112 with NRF 128, can include registering/storing MME 112 as a new NF type within NRF 128 'CUSTOM_MME' using the NF management API primitive (e.g., using the Register NF instance Operation ID) along with appropriately defined NF services and NF profiles. In at least one embodiment, NF profile and/or services data that may be configured for the new NF for a given MME, such as MME 112, type may include, but not be limited to MME Code (MMEC), MMEGI, Globally Unique MME Identifier (GUMMEI), 4G Tracking Area Identifier (TAI) range/coverage list, S1-MME interface information (e.g., for interface with the 4G RAN/eNBs), S10 interface information (e.g., service information identifying whether the S10 interface is supported by the MME), S26 interface information, instance ID, service endpoint addresses (IPv4/IPv6), etc. and associating the NF profile to an NF service.

Figure 3:
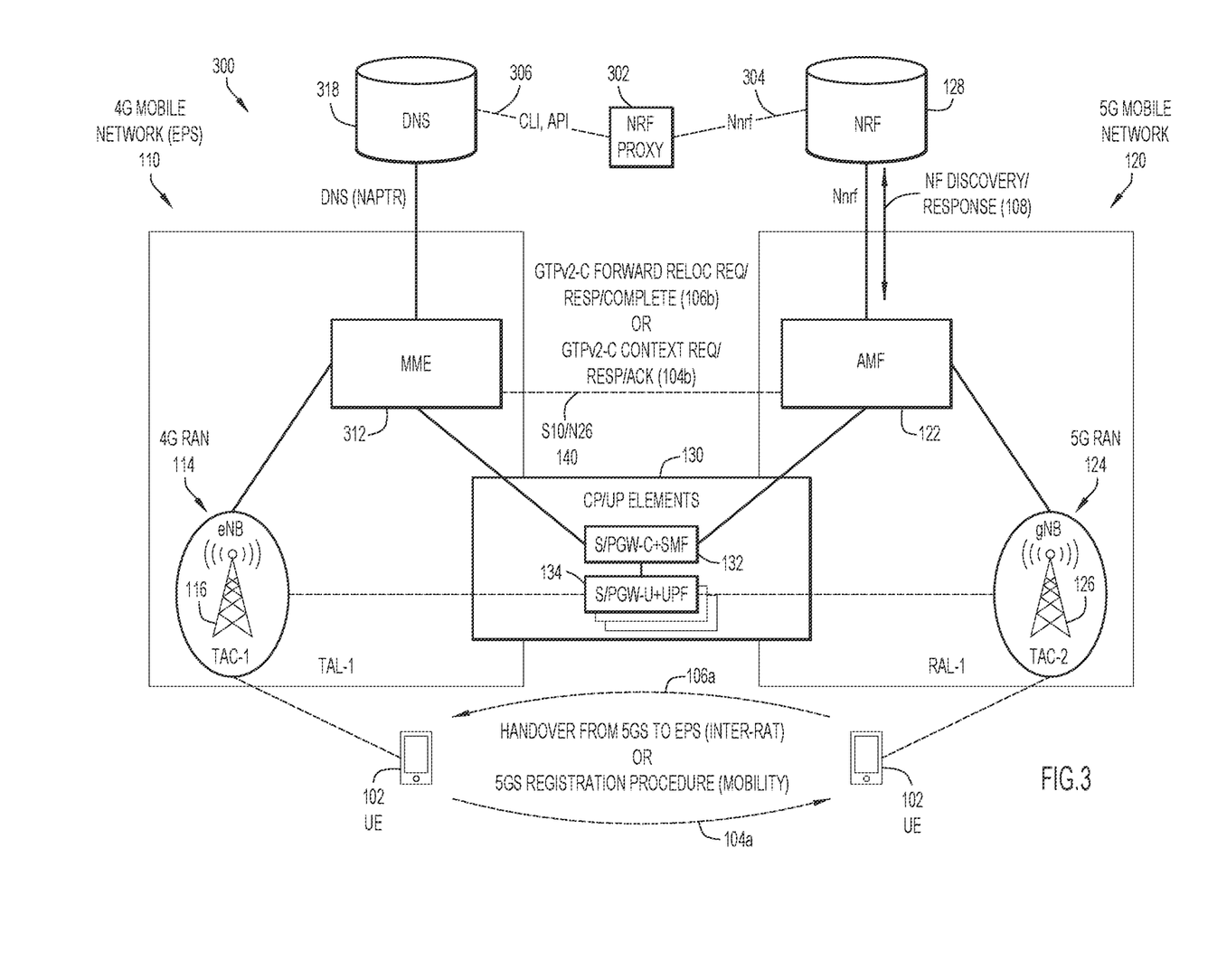
FIG. 3 is a diagram of yet another system in which techniques that facilitate mobility management entity (MME) identification for a user equipment context transfer may be implemented, according to an example embodiment.
Figure 4:
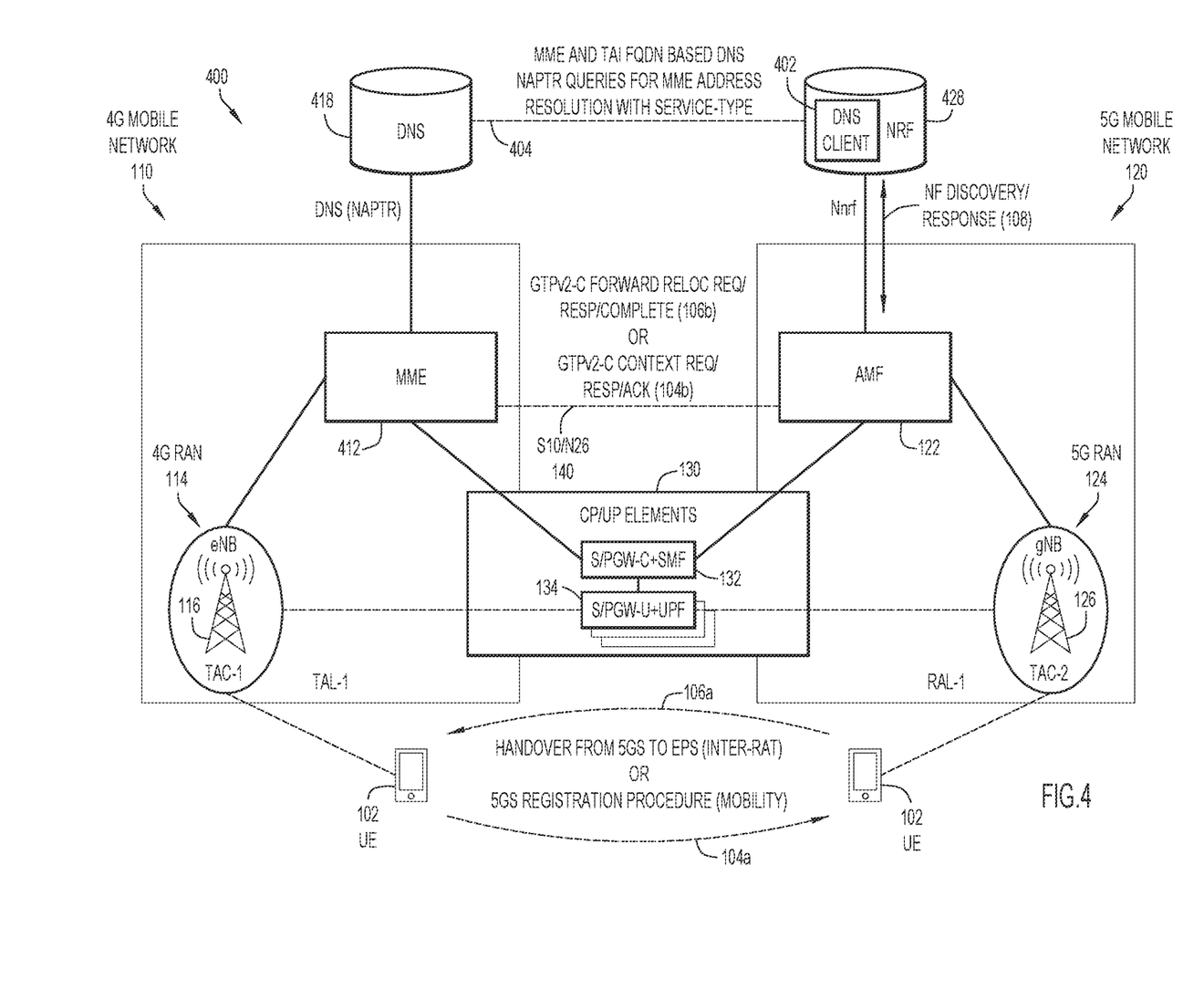
FIG. 4 is a diagram of yet another system in which techniques that facilitate mobility management entity (MME) identification for a user equipment context transfer may be implemented, according to an example embodiment.

Thus, to facilitate inter-RAT mobility for a 4G mobile network (EPS) to a 5G mobile network (5GS) mobility scenario involving the 3GPP Registration procedure (104a) for UE 102 or for a 5G mobile network (5GS) to 4G mobile network (EPS) mobility scenario involving a connected mode handover (106a) for UE 102, embodiments herein may provide for any combination of: implementing and enabling Nnrf interface support between a 4G MME and an NRF node of a 5G mobile network directly (e.g., via NF consumer service module or logic 113 embedded within the MME, as shown in the embodiment of FIG. 1) or via a proxy element or interworking function that may operate as an NF consumer service to facilitate registering/managing the MME as a new/custom NF type in the NRF (e.g., as discussed for FIG. 2, below); implementing and enabling communications between a DNS server and an NRF node via a proxy element or IWF (as discussed for FIG. 3, below); or implementing an enabling communications between a DNS server and an NRF node via a DNS client configured for the NRF node (as discussed for FIG. 4, below).

Various features discussed below involve operations associated with Globally Unique Temporary Identifier (GUTIs) for UE 102, such as a 4G-GUTI (sometime referred to as an EPS GUTI) and/or a 5G-GUTI (sometimes referred to as a 5G NR GUTI). In general, a GUTI is a temporary identifier assigned by an MME/AMF to identify a UE/subscriber to a given mobile network.

Per 3GPP Specifications, a 4G-GUTI for a UE/subscriber is constructed using a GUMMEI that identifies a given MME that allocated the 4G-GUTE for the UE/subscriber and an MME Temporary Subscriber Identity (M-TMSI) in which the M-TMSI uniquely identifies the UE/subscriber within the given MME. The GUMMEI is constructed from a Mobile Country Code (MCC), a Mobile Network Code (MCC), and an MME identifier (MMEI) in which the MMEI identifies a given MME within a network. The MMEI is constructed from the MMEGI and MMEC.

Per 3GPP Specifications, a 5G-GUTI is constructed of a Public Land Mobile Network Identifer (PLMNID), an AMF Identifier (AMF ID), and a 5G TMSI in which the 5G TMSI uniquely identifies a UE/subscriber within a given AMF. The PLMNID is constructed from an MCC and an MNC. The AMF ID is constructed of an AMF Region ID, an AMF Set ID, and an AMF pointer in which the AMF pointer identifies a given AMF within a set of AMFs. The PLMNID and the AMF ID may represent a Global Unique AMF Identifier (GUAMI).

For 4G mobile network (EPS) 110 to 5G mobile network (5GS) 120 inter-RAT mobility involving the Registration procedure (104a), under an assumption that MME 112 is registered/stored as a CUSTOM_MME NF type within NRF 128 in accordance with embodiments herein, the AMF 122 receives a Registration request message from the single-registration idle mode UE 102, which may indicate an inter-RAT mobility event to the AMF 122 for UE 102. Once the AMF 122 receives the Registration request from single-registration idle mode UE 102 (as per 3GPP TS 23.502— Section 4.11.1.3), the AMF 122 is to derive the (old) MME 112 address to facilitate a UE 102 context transfer from MME 112 to AMF 122. During the registration procedure, UE 102 includes a 5G-GUTI mapped from a 4G-GUTI as an "old" GUTI (i.e., the old 5G-GUTI, discussed further below), a native 5G-GUTI (if available) as an additional GUTI, and an indication indicating that the UE is moving from the EPS in the Registration request. For embodiments herein, it is assumed that dual RAT capable UEs (e.g., 4G/5G capable UEs such as UE 102) are capable of supporting 4G-GUTI to 5G-GUTI mapping processes, and vice-versa. Further, it is assumed that dual RAT capable network elements, such as AMF 122 are capable of supporting 4G-GUTI to 5G-GUTI mapping processes, and vice-versa.

In order to derive the MME 112 IP address and a 4G-GUTI from the old 5G-GUTI, AMF 122 performs an NF Discovery/response exchange (108) to query the NRF 128 using the NF Discover primitive containing at least the old 5G-GUTI (i.e., using the MMEGI and MMEC from the GUMMEI embedded in the 4G-GUTI from which the old 5G-GUTI is mapped) in which the NRF 128 returns the MME 112 IP address from corresponding MME 112 information stored in the NRF 128. Once AMF 122 obtains the MME 112 IP address and any other MME 112 information, as may be applicable, AMF 122 performs a Context Request exchange (104*b*) with MME 112 via the S10 or N26 interface 142 including the 4G-GUTI mapped from the old 5G-GUTI in order for the AMF 122 to obtain context information for UE 102 from MME 112 to complete the Registration procedure.

In one example, the Context Request exchange (104*b*) may include an exchange involving a control plane General Packet Radio Service (GPRS) Tunneling Protocol version 2 (GTPv2-C) Context Request/Response/Acknowledgement signaling exchange between AMF 122 and MME 112, as may be prescribed by 3GPP Specifications. Context information for UE 102 may include any combination of EPS Mobility Management (EMM) context information, EPS Session Management (ESM) context information, and/or the like as may be prescribed by 3GPP Specifications.

For 5G mobile network (5GS) 120 to 4G mobile network (EPS) 110 inter-RAT mobility involving connected mode handover (106*a*) of UE 102, under an assumption that MME 112 is registered/stored as a CUSTOM_MME NF type within NRF 128 in accordance with embodiments herein, the 5G RAN/gNB 124/126 can determine that UE 102 is to be handed over to the 4G RAN 114 (E-UTRAN). In various embodiments, the 5G to 4G access handover determination may be based on signal measurements, tracking area information, etc. obtained by the 5G RAN/gNB 124/126, which may trigger handover for UE 102 to the 4G RAN 114.

Upon determining that UE 102 is to be handed over to the 4G RAN 114, the 5G RAN/gNB 124/126 communicates a Handover Required message to AMF 122 including various information such as, a Target eNB Identifier Information Element (IE), direct forwarding path availability, source to target transparent container, inter system handover indication, etc., as may be prescribed by 3GPP Specifications. The AMF 122 can determine from the Target eNB Identifier IE that the type of handover for UE 102 is an inter-RAT mobility event involving a handover of UE 102 to the E-UTRAN.

For this scenario, the AMF 122 is to select a target MME (e.g., MME 112) as described in 3GPP TS 23.401, clause 4.3.8.3, using a TAI FQDN indicated in the Target eNB Identifier IE in order to transfer context for UE 102 to the MME complete the handover for the UE 102 session. To achieve this selection in accordance with embodiments herein, AMF 122 may also perform an NF Discover/response exchange (108) with NRF 128 using the NF Discover primitive that may include the TAI FQDN in order to retrieve the MME 112 information (e.g., IP address) from the NRF 128.

After successfully determining the target MME 112 information, the AMF 122 performs a Forward Relocation exchange (106*b*) to transfer the context for UE 102 to MME 112 utilizing the S10 or N26 interface (if configured) and completes the handover of UE 102 to the EPS 4G RAN/eNB 114/116. In one example, the Forward Relocation exchange may include an exchange involving a GTPv2-C Forward Relocation Request/Response/Complete notification signaling exchange between AMF 122 and MME 112, as may be prescribed by 3GPP Specifications to proceed and complete the handover successfully to the EPS 4G RAN 114.

Thus, embodiments herein facilitate graceful handling of various inter-RAT mobility scenarios by providing for the ability to register MME(s) of a 4G mobile network into an NRF of a 5G mobile network, which enables an AMF to identify such MME(s) using NF Discover queries in order to perform UE context transfers, etc. for such inter-RAT mobility scenarios.

Figure 2:
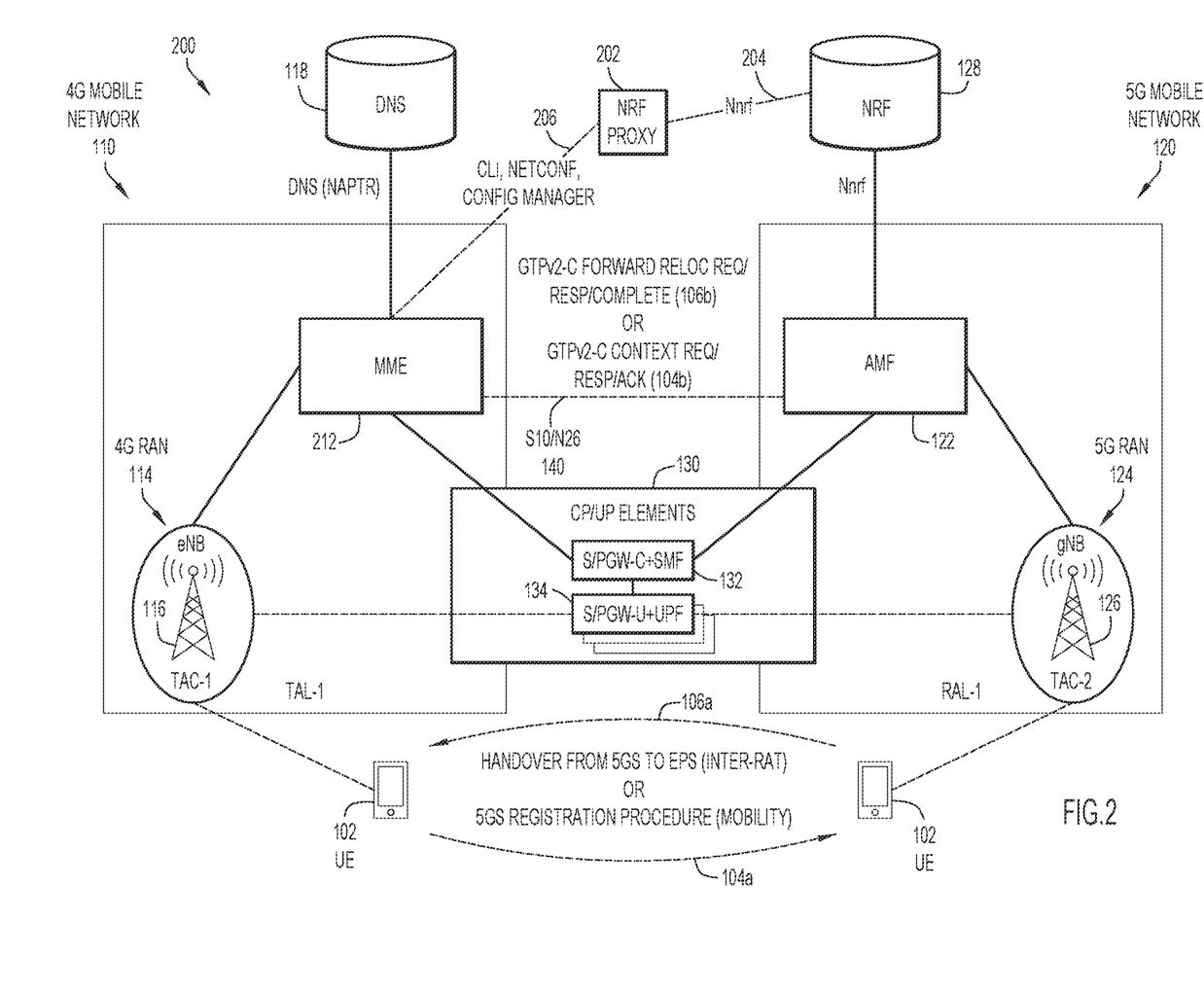
FIG. 2 is a diagram of another system in which techniques that facilitate mobility management entity (MME) identification for a user equipment context transfer may be implemented, according to an example embodiment.

Referring to FIG. 2, FIG. 2 is a block diagram of another system 200 in which techniques that facilitate MME identification for a UE context transfer may be implemented, according to an example embodiment. System 200 may be similar to system 100 that inter-RAT scenario operations 104*a*/104*b*, 106*a*/106*b*, and 108 may be performed to facilitate UE 102 context transfers. As such, features/elements of system 100 of FIG. 1 that may remain unchanged for system 200 of FIG. 2 are not discussed for the embodiment of FIG. 2 in order to illustrate other features of system 200.

In particular, system 200 for the embodiment of FIG. 2 illustrates an alternative implementation that may include an NRF proxy element 202, which may be external to the MME 212 and the NRF 128, may be communicatively coupled with NRF 128 via an Nnrf interface 204, and may be communicatively coupled with an MME 212 via an interface 206. In various embodiments, interface 206 may facilitate communications between NRF proxy element 202 and MME 212 via any combination of Command Line Interface (CLI) communications, Network Configuration Protocol (NETCONF) communications, API communications, configuration management communications, and/or the like.

NRF proxy element 202 may include NF consumer service logic to facilitate registering/storing MME information for MME 212 as a CUSTOM_MME NF type within NRF 128 using techniques as discussed for embodiments herein to facilitate operations for the EPS to 5GS and 5GS to EPS inter-RAT mobility scenarios discussed herein. Further, once MME 212 is registered to the NRF 128, the MME 212 may perform NF management services with NRF 128 via NRF proxy element 202, as discussed herein.

Referring to FIG. 3, FIG. 3 is a block diagram of another system 300 in which techniques that facilitate MME identification for a UE context transfer may be implemented, according to an example embodiment. System 300 may also be similar to system 100 that inter-RAT scenario operations 104*a*/104*b*, 106*a*/106*b*, and 108 may be performed to facilitate UE 102 context transfers. As such, features/elements of system 100 of FIG. 1 that may remain unchanged for system 300 of FIG. 3 are not discussed for the embodiment of FIG. 3 in order to illustrate other features of system 300.

In particular, system 300 for the embodiment of FIG. 3 illustrates an alternative implementation that may include an NRF proxy element 302, which may be external to the DNS server 318 and the NRF 128 and may be communicatively coupled with NRF 128 via an Nnrf interface 304 and may be communicatively coupled with a DNS server 318 via an interface 306. Also shown in system 300 is an MME 312. MME 312 may differ from MME 112 of FIG. 1 and MME 212 of FIG. 2 in that MME 312 may interface with DNS 318 instead of also interfacing with NRF 128 via NF consumer service logic.

In various embodiments, interface 306 may facilitate communications between NRF proxy element 302 and DNS 318 via any combination of CLI communications, API communications, and/or the like.

To facilitate registering/storing MME information for MME 312 as a CUSTOM_MME NF type within NRF 128, NRF proxy element 302 may provide for mapping or otherwise translating NAPTR DNS resource records for MME 312 from DNS server 318 into NRF 128. NRF proxy element 302 may also provide for translating such NAPTR DNS records to NF profiles/services with NRF 128 as well as performing any NF management services.

Consider, as noted above, that there may be multiple MMEs in a deployment. In such deployments, a DNS server, such as DNS server 318 could maintain NAPTR DNS records for all MMEs in such a deployment. In at least one embodiment, an NRF proxy element configured to interface between the DNS server and an NRF for a 5G mobile network, such as NRF proxy element 302, may provide active synchronization (e.g., registration, updating, etc.) of all MME NAPTR DNS records to the NRF (as the CUSTOM_MME NF type) for MMEs with the network and may also perform NF management services, as MMEs may be added, removed, modified, etc. for the network.

Referring to FIG. 4, FIG. 4 is a block diagram of another system 400 in which techniques that facilitate MME identification for a UE context transfer may be implemented, according to an example embodiment. System 400 may also be similar to system 100 that inter-RAT scenario operations 104*a*/104*b*, 106*a*/106*b*, and 108 may be performed to facilitate UE 102 context transfers. As such, features/elements of system 100 of FIG. 1 that may remain unchanged for system 400 of FIG. 4 are not discussed for the embodiment of FIG. 4 in order to illustrate other features of system 400.

In particular, system 400 for the embodiment of FIG. 4 illustrates an alternative implementation that may include an NRF 428 that is configured with a DNS client 402 in which the DNS client 402 is communicatively coupled to a DNS server 418 that interfaces with an MME 412 (and any number of other MMEs that may be configured for the system 400) facilitate storing MME information for MME 412 (and any other MMEs) in the NRF 428. MME 412 may be configured similar to MME 312 of FIG. 3.

DNS client 402 may facilitate registering/storing MME information for MME 412 as a CUSTOM_MME NF type within NRF 428 by mapping or otherwise translating NAPTR DNS resource records for MME 412 from DNS server 418 into NRF 128. NRF proxy element 302 may also provide for translating such NAPTR DNS records to NF profiles/services with NRF 428 as well as performing any NF management services.

Further for an embodiment of system 400 as illustrated in FIG. 4, if a particular MME, such as MME 412, as the CUSTOM_MME NF type is unavailable in the NRF 428 (e.g., is not yet registered in the NRF), then NRF 428 via DNS client 402 may be enhanced to query the DNS server 418 (e.g., using the MME node FQDN or TAI FQDN) via a DNS interface 404 in order to resolve the MME 412 IP address and, in some instances, may also determine service-type information for the MME 412 for services that may/may not supported by MME 412 (e.g., whether MME 412 supports the S10 and/or N26 interface type, etc.).

Figure 5:
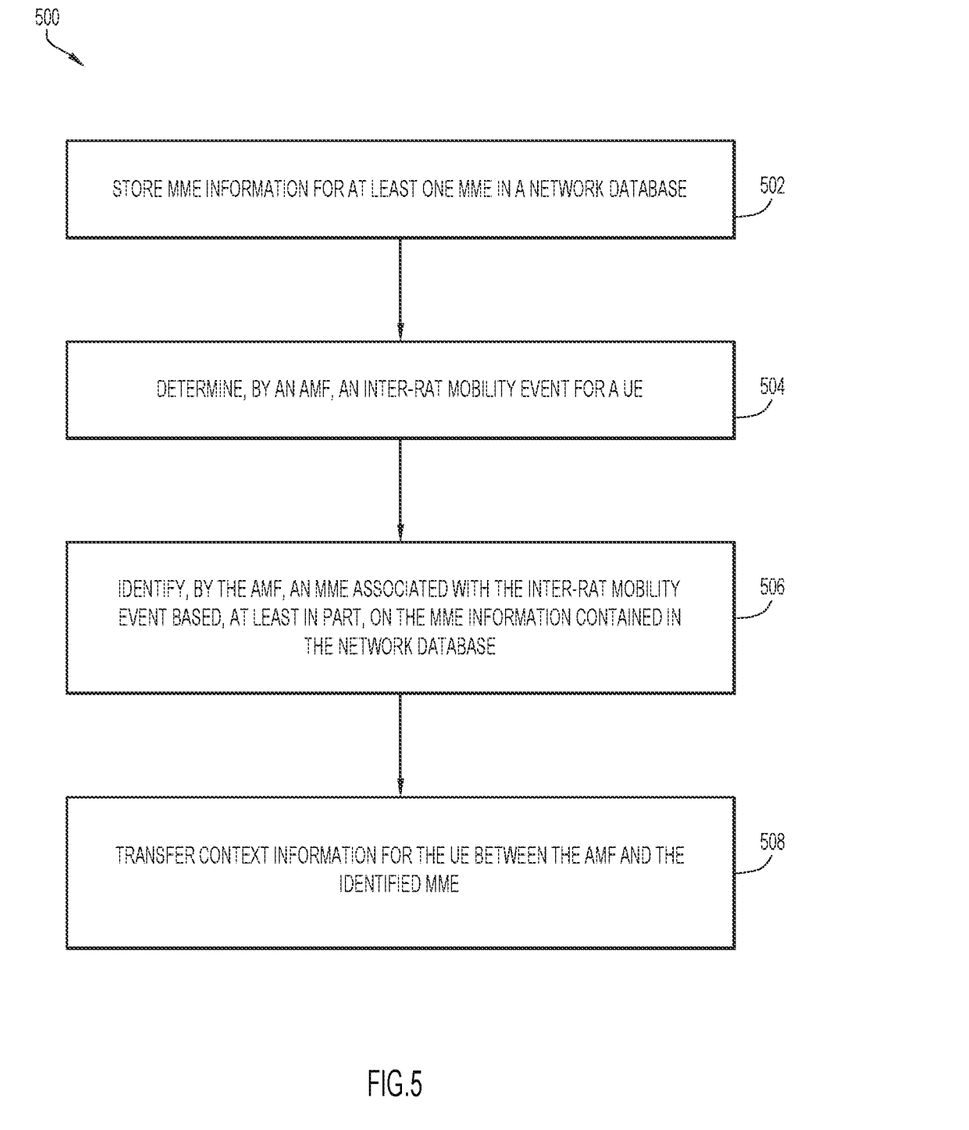
FIG. 5 is a flow chart depicting a method, according to an example embodiment.

Referring to FIG. 5, FIG. 5 is a flow chart depicting a method 500 according to an example embodiment. In particular, method 500 illustrates example operations that may be performed, at least in part, by an AMF (e.g., AMF 122) to provide for identifying an MME to facilitate UE context transfers, as discussed for various techniques presented herein.

At 502, the method may include storing (e.g., registering) MME information for at least one MME in a network database (e.g., NRF 128). In at least one embodiment, the storing may be performed by the at least one MME in which the at least one MME is configured to interface directly with the network database (e.g., as illustrated for the embodiment of FIG. 1). In at least one embodiment, the storing may be performed utilizing a proxy element communicatively coupled to the at least one MME and to the network database (e.g., as illustrated for the embodiment of FIG. 2). In at least one embodiment, the storing may be performed utilizing a proxy element communicatively coupled to a DNS server and to the network database in which the at least one MME interfaces with the DNS server (e.g., as illustrated for the embodiment of FIG. 3). In at least one embodiment, the storing may be performed utilizing a DNS client configured for the network database in which the DNS client is communicatively coupled to a DNS sever that interfaces with the at least one MME (e.g., as illustrated for the embodiment of FIG. 4).

At 504, the method may include determining, by an AMF (e.g., AMF 122), an inter-RAT mobility event for a UE. In at least one embodiment, the inter-RAT mobility event may be determined based on obtaining, by the AMF, a registration request for transitioning the UE from a 3GPP 4G access network to a 3GPP 5G access network while the UE is in an idle mode. In at least one embodiment, the inter-RAT mobility event may be determined based on obtaining, by the AMF, a handover required message for the UE for a handover of the UE from a 3GPP 5G access network to a 3GPP 4G access network while the UE is in a connected mode.

At 506, the method may include identifying, by the AMF, an MME associated with the inter-RAT mobility event based, at least in part, on the MME information contained in the network database (e.g., NRF 128). In at least one embodiment, the identifying may include querying the network database (e.g., using the NF discover primitive and associated MME query information) to obtain the MME information (e.g., IP address, service-type information, etc.) from the network database.

At 508, the method may include transferring context information for the UE between the AMF and the identified MME. In at least one embodiment, such as for an EPS to 5GS inter-RAT mobility event involving the registration procedure for an idle mode UE, transferring the context information for the UE includes the AMF obtaining the context information from the MME. In at least one embodiment, such as for a 5GS to EPS inter-RAT mobility event involving a handover of the UE to the EPS, transferring the context information for the UE includes the AMF providing the context information to the MME.

Figure 6:
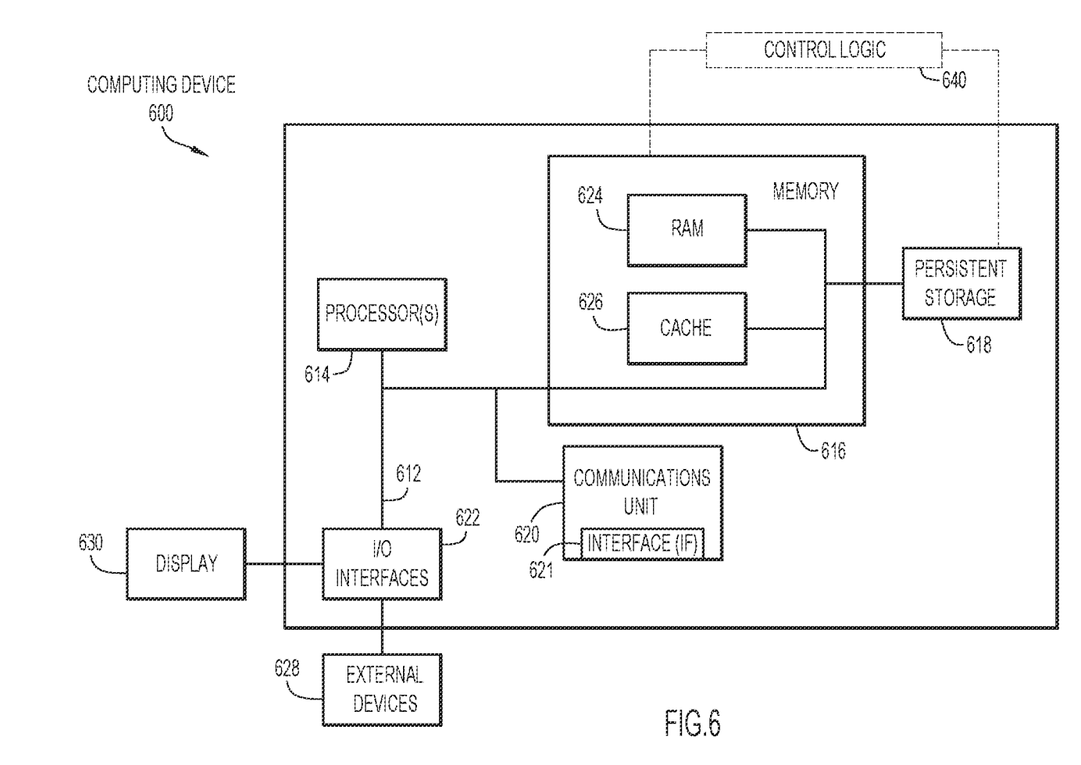
FIG. 6 is a hardware block diagram of a computing device that may perform functions associated with any combination of operations, in connection with the techniques depicted in FIGS. 1-5.

Referring to FIG. 6, FIG. 6 illustrates a hardware block diagram of a computing device 600 that may perform functions associated with storing/registering MME information in an NRF to facilitate the MME identification and context transfer operations discussed herein in connection with the techniques depicted in FIGS. 1-5. In various embodiments, a computing device, such as computing device 600 or any combination of computing devices 600, may be configured as any of an MME, an AMF, an NRF, an NRF proxy element, etc. as discussed for the techniques depicted in connection with FIGS. 1-5.

It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 618, at least one communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616, which may be inclusive of one or more memory element(s), includes random access memory (RAM) 624 and cache memory 626. In general, memory 616 can include any suitable volatile or non-volatile computer readable storage media. Instructions for control logic 640 may be stored in memory 616 and/or persistent storage 618 for execution by processor(s) 614.

When the processor(s) 614 execute control logic 640, the processor(s) 614 are caused to perform the operations described above in connection with FIGS. 1-5. For example, if computing device 600 is implemented as the MME 112 of the embodiment of FIG. 1, the control logic 640 may be implemented as NF consumer service logic such that when executing the control logic 640, the processor(s) 614 are cause to perform operations associated with registering MME 112 as the CUSTOM_MME NF type in NRF 128 along with corresponding NF profile/NF service information, performing NF management services, and/or performing any other operations for MME 112. In another example, if computing device 600 is implemented as the NRF proxy element 202 of the embodiment of FIG. 2, executing the control logic 640 may cause processor(s) 614 to perform operations associated with registering the MME 212 as the CUSTOM_MME NF type in NRF 128 along with corresponding NF profile/NF service information, performing NF management services, and/or performing any other operations discussed herein.

In yet another example, if computing device 600 is implemented as the NRF proxy element 302 of the embodiment of FIG. 3, executing the control logic 640 may cause processor(s) 614 to perform operations associated with registering the MME 312 as the CUSTOM_MME NF type in NRF 128 along with corresponding NF profile/NF service information utilizing MME DNS NAPTR resource records obtained from DNS 318, performing NF management services, and/or performing any other operations discussed herein. In yet another example, if the computing device 600 is implemented as the NRF 428 of the embodiment of FIG. 4, executing the control logic 640 may cause processor(s) 614 to perform operations for DNS client 402 associated with registering the MME 412 as the CUSTOM_MME NF type in NRF 428 along with corresponding NF profile/NF service information utilizing MME DNS NAPTR resource records obtained from DNS server 418, performing NF management services, etc. and/or performing any other operations discussed herein.

In yet another example, if computing device 600 is implemented as AMF 122 of the embodiments of FIGS. 1-4, executing the control logic may cause the processor(s) to perform operations associated with determining an inter-RAT mobility event for a UE, identifying an MME associated with the inter-RAT mobility event, transferring context information for the UE between the AMF and the MME, and/or performing any other operations discussed herein.

One or more programs and/or other logic may be stored in persistent storage 618 for execution by one or more of the respective computer processors 614 via one or more memory element(s) of memory 616. The persistent storage 618 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, may provide for communications with other data processing systems, networks, and/or devices. In these examples, each communications unit 620 may include at least one interface (IF) 621, which may facilitate communications with systems, networks, and/or devices utilizing any combination of hardware, software, etc. to facilitate one or more connections for communications discussed herein. Accordingly, communications units 620 may provide communications through the use of any combination of physical and/or wireless communications links.

I/O interface(s) 622, which may be inclusive of one or more network interface cards (NICs), allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

In one form, a computer-implemented method is provided that may include determining, by an Access and Mobility Management Function (AMF), an inter-Radio Access Technology (inter-RAT) mobility event for a user equipment; identifying, by the AMF, a Mobility Management Entity (MME) associated with the inter-RAT mobility event based, at least in part, on MME information contained in a network database; and transferring context information for the user equipment between the AMF and the MME. The network database may be a Network Repository Function (NRF) for a Third Generation Partnership Project (3GPP) Fifth Generation (5G) or next Generation (NG) mobile network in which the identifying may include querying the NRF to obtain the MME information.

The method may further include storing the MME information for an MME network function type within the network database. In various instances, the storing may performed utilizing at least one of the MME, wherein the MME is configured to interface directly with the network database; a proxy element communicatively coupled to the MME and to the network database; a proxy element communicatively coupled to a Domain Name System (DNS) server and to the network database, wherein the MME interfaces with the DNS server; and a Domain Name System (DNS) client configured for the network database, wherein the DNS client is communicatively coupled to a DNS sever that interfaces with the MME.

In some instances, the inter-RAT mobility event for the user equipment may be determined based on obtaining, by the AMF, a registration request for transitioning the user equipment from a 3GPP Fourth Generation (4G) access network to a 3GPP Fifth Generation (5G) access network while the user equipment is in an idle mode in which transferring the context information for the user equipment includes the AMF obtaining the context information from the MME.

In some instances, the inter-RAT mobility event for the user equipment may be determined based on obtaining, by the AMF, a handover required message for the user equipment for a handover of the user equipment from a Third Generation Partnership Project (3GPP) Fifth Generation (5G) access network to a 3GPP Fourth Generation (4G) access network while the user equipment is in a connected mode in which transferring the context information for the user equipment includes the AMF providing the context information to the MME.

In one form, a system is provided that may include a Mobility Management Entity (MME) configured for a Third Generation Partnership Project (3GPP) Fourth Generation (4G) mobile network; a Domain Name System (DNS) server configured for the 3GPP 4G mobile network; a Network Repository Function (NRF) configured for a 3GPP Fifth Generation (5G) mobile network; and an Access and Mobility Management Function (AMF) configured for the 3GPP 5G mobile network, wherein one of the MME or the DNS server are capable of communicating with the NRF to store or manage information for the MME within the NRF.

In some implementations, the MME may configured to communicate with the NRF to store or manage the information for the MME within the NRF and wherein the information is associated with an MME network function type configured for the NRF in which the MME supports 3GPP Nnrf interface communications with the NRF.

In some implementations, the MME may be configured to communicate with the NRF using a proxy element external to the MME and the NRF to store or manage the information for the MME within the NRF and wherein the information is associated with an MME network function type configured for the NRF.

In some implementations, the DNS server may be configured to communicate with the NRF using a proxy element external to the MME and the NRF to store or manage the information for the MME within the NRF and wherein the information is associated with an MME network function type configured for the NRF.

In some implementations, the NRF may include a DNS client to facilitate communications with the DNS server to store or manage the information for the MME within the NRF and wherein the information is associated with an MME network function type configured for the NRF.

In one form, a system is provided that may include at least one memory element for storing data; and at least one processor for executing instructions associated with the data, wherein executing the instructions causes the system to perform operations, which may include determining, by an Access and Mobility Management Function (AMF), an inter-Radio Access Technology (inter-RAT) mobility event for a user equipment; identifying, by the AMF, a Mobility Management Entity (MME) associated with the inter-RAT mobility event based, at least in part, on MME information contained in a network database; and transferring context information for the user equipment between the AMF and the MME. The network database may be a Network Repository Function (NRF) for a Third Generation Partnership Project (3GPP) Fifth Generation (5G) or next Generation (NG) mobile network in which the identifying may include querying the NRF to obtain the MME information.

In summary, presented herein are efficient techniques through which a 3GPP AMF of a 5G mobile network can retrieve information for a MME of a 3GPP 4G mobile network to support graceful mobility for various inter-RAT mobility scenarios, such as inter-RAT mobility single-mode registration involved in 4G EPS to 5GS idle mode UE transitions and 5GS to 4G EPS UE connected mode handover scenarios.

In various embodiments, Nnrf interface support can be provided for an MME either directly by embedding an NF consumer service module/logic or by providing an NRF proxy element or IWF that can operate as an NF consumer service module for an MME. In other embodiments, an NRF proxy element or IWF communicatively coupled to a DNS server and an NRF can be provided. In still other embodiments, a DNS client can be provided for an NRF to interface with a DNS server. Any of these techniques may be utilized to facilitate registration of an MME to an NRF as a new custom NF type, such as the CUSTOM_MME NF type discussed herein. Once an MME is registered to an NRF, NF management services may also be performed. These techniques can assist an AMF in identifying/selecting an MME through NRF queries utilizing the NF Discover service primitive in order for the NRF to provide MME information to the AMF during such inter-RAT mobility scenarios.

Thus, the techniques presented herein bridge a gap that is observed in current 3GPP standards for these mobility-interworking scenarios. Without the techniques presented herein, an AMF may not successfully derive peer-MME node information, which can lead to failures for inter-RAT mobility for the EPS to 5GS single-registration idle mode scenario and also for the 5GS to EPS handover scenario, each of which can negatively affect subscriber mobility experience.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of,' 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein (e.g., NF type data, NF profile data, NF service data, etc.) may be stored within any conventional or other data structures (e.g., files, arrays, lists, stacks, queues, records, etc.) and may be stored in any desired storage unit (e.g., database, data or other repositories, queue, etc.). The data or information transmitted between entities (e.g., NF type data, NF profile data, NF service data, etc.) may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data (e.g., resource record data, etc.).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining, by an Access and Mobility Management Function (AMF), an inter-Radio Access Technology (inter-RAT) mobility event for a user equipment, wherein the inter-RAT mobility event is associated with a Mobility Management Entity (MME);
    querying, by the AMF, a Network Repository Function (NRF) via a Third Generation Partnership Project (3GPP) Nnrf interface for the NRF using an MME code (MMEC) and an MME Group identifier (MMEGI) for the MME stored in the NRF or using a tracking area identifier associated with a tracking area identifier list for the MME stored in the NRF;
    obtaining, by the AMF based on the query, an Internet Protocol (IP) address for the MME; and
    transferring context information for the user equipment between the AMF and the MME.

2. The method of claim 1, further comprising:
    storing the MMEGI, the MMEC, the tracking area identifier list, and the IP address for the MME as an MME network function type within the NRF.

3. The method of claim 2, wherein the storing is performed utilizing at least one of:
    the MME, wherein the MME is configured to interface directly with the NRF;
    a proxy element communicatively coupled to the MME and to the NRF;
    a proxy element communicatively coupled to a Domain Name System (DNS) server and to the NRF, wherein the MME interfaces with the DNS server; and
    a Domain Name System (DNS) client configured for the NRF, wherein the DNS client is communicatively coupled to a DNS sever that interfaces with the MME.

4. The method of claim 2, further comprising:
    storing an indication of whether the MME supports 3GPP N26 communications within the NRF.

5. The method of claim 1, wherein the inter-RAT mobility event for the user equipment is determined based on obtaining, by the AMF, a registration request for transitioning the user equipment from a 3GPP Fourth Generation (4G) access network to a 3GPP Fifth Generation (5G) access network while the user equipment is in an idle mode.

6. The method of claim 5, wherein transferring the context information for the user equipment includes the AMF obtaining the context information from the MME.

7. The method of claim 1, wherein the inter-RAT mobility event for the user equipment is determined based on obtaining, by the AMF, a handover required message for the user equipment for a handover of the user equipment from a Third Generation Partnership Project (3GPP) Fifth Generation (5G) access network to a 3GPP Fourth Generation (4G) access network while the user equipment is in a connected mode.

8. The method of claim 7, wherein transferring the context information for the user equipment includes the AMF providing the context information to the MME.

9. One or more non-transitory computer readable storage media encoded with instructions that, when executed by a processor, cause the processor to perform operations, comprising:
    determining, by an Access and Mobility Management Function (AMF), an inter-Radio Access Technology (inter-RAT) mobility event for a user equipment, wherein the inter-RAT mobility event is associated with a Mobility Management Entity (MME);
    querying, by the AMF, a Network Repository Function (NRF) via a Third Generation Partnership Project (3GPP) Nnrf interface for the NRF using an MME code (MMEC) and an MME Group identifier (MMEGI) for the MME stored in the NRF or using a tracking area identifier associated with a tracking area identifier list for the MME stored in the NRF;
    obtaining, by the AMF based on the query, an Internet Protocol address for the MME; and
    transferring context information for the user equipment between the AMF and the MME.

10. The media of claim 9, the operations further comprising:
    storing the MMEGI, the MMEC, the tracking area identifier list, and the IP address for the MME as an MME network function type within the NRF.

11. The media of claim 10, wherein the storing is performed utilizing at least one of:
    the MME, wherein the MME is configured to interface directly with the NRF;
    a proxy element communicatively coupled to the MME and to the NRF;
    a proxy element communicatively coupled to a Domain Name System (DNS) server and to the NRF, wherein the MME interfaces with the DNS server; and
    a Domain Name System (DNS) client configured for the NRF, wherein the DNS client is communicatively coupled to a DNS sever that interfaces with the MME.

12. The media of claim 9, wherein the inter-RAT mobility event for the user equipment is determined based on obtaining, by the AMF, a registration request for transitioning the user equipment from a 3GPP Fourth Generation (4G) access network to a 3GPP Fifth Generation (5G) access network while the user equipment is in an idle mode and wherein transferring the context information for the user equipment includes the AMF obtaining the context information from the MME.

13. The media of claim 9, wherein the inter-RAT mobility event for the user equipment is determined based on obtaining, by the AMF, a handover required message for the user equipment for a handover of the user equipment from a Third Generation Partnership Project (3GPP) Fifth Generation (5G) access network to a 3GPP Fourth Generation (4G) access network while the user equipment is in a connected mode and wherein transferring the context information for the user equipment includes the AMF providing the context information to the MME.

14. A system comprising:
    a Mobility Management Entity (MME) configured for a Third Generation Partnership Project (3GPP) Fourth Generation (4G) mobile network;
    a Domain Name System (DNS) server configured for the 3GPP 4G mobile network;
    a Network Repository Function (NRF) including a 3GPP Nnrf interface configured for a 3GPP Fifth Generation (5G) mobile network; and
    an Access and Mobility Management Function (AMF) configured for the 3GPP 5G mobile network, wherein one of the MME or the DNS server are capable of communicating with the NRF to store or manage service information for the MME within the NRF, the service information comprising an MME code (MMEC), an MME Group Identifier (MMEGI), a tracking area identifier list, and an Internet Protocol (IP) Address for the MME and wherein the AMF obtains, for an inter-Radio Access Technology (inter-RAT) mobility event for a user equipment, the IP address for the MME based on querying the NRF via the 3GPP Nnrf interface using the MMEC and the MMEGI or using a tracking area identifier associated with the tracking area identifier list.

15. The system of claim 14, wherein the MME is configured to communicate with the NRF to store or manage the service information for the MME within the NRF and wherein the information is associated with an MME network function type configured for the NRF.

16. The system of claim 15, wherein the MME supports 3GPP Nnrf interface communications with the NRF.

17. The system of claim 14, wherein the MME is configured to communicate with the NRF using a proxy element external to the MME and the NRF to store or manage the service information for the MME within the NRF and wherein the service information is associated with an MME network function type configured for the NRF.

18. The system of claim 14, wherein the DNS server is configured to communicate with the NRF using a proxy element external to the MME and the NRF to store or manage the service information for the MME within the NRF and wherein the service information is associated with an MME network function type configured for the NRF.

19. The system of claim 14, wherein the NRF comprises a DNS client to facilitate communications with the DNS server to store or manage the service information for the MME within the NRF and wherein the service information is associated with an MME network function type configured for the NRF.

20. The system of claim 14, wherein the service information for the MME within the NRF further comprises an indication of whether the MME supports 3GPP N26 communications.

* * * * *